(12) United States Patent
Lawson

(10) Patent No.: US 11,161,309 B2
(45) Date of Patent: Nov. 2, 2021

(54) ELECTROPHOTOGRAPHY-BASED 3D PRINTING WITH IMPROVED LAYER UNIFORMITY

(71) Applicant: Eastman Kodak Company, Rochester, NY (US)

(72) Inventor: Joseph Lawson, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 447 days.

(21) Appl. No.: 16/185,360

(22) Filed: Nov. 9, 2018

(65) Prior Publication Data

US 2020/0147895 A1 May 14, 2020

(51) Int. Cl.
*B29C 64/129* (2017.01)
*B29C 64/40* (2017.01)
*B33Y 10/00* (2015.01)

(52) U.S. Cl.
CPC ............ *B29C 64/40* (2017.08); *B29C 64/129* (2017.08); *B33Y 10/00* (2014.12)

(58) Field of Classification Search
None
See application file for complete search history.

(56) References Cited

U.S. PATENT DOCUMENTS

| | | | |
|---|---|---|---|
| 4,961,154 A * | 10/1990 | Pomerantz | B29C 64/129 345/419 |
| 9,144,940 B2 | 9/2015 | Martin | |
| 10,112,379 B2 | 10/2018 | Sreekumar | |
| 2013/0077996 A1 | 3/2013 | Hanson et al. | |
| 2013/0077997 A1 | 3/2013 | Hanson et al. | |
| 2013/0186549 A1 | 7/2013 | Comb et al. | |
| 2013/0186558 A1 | 7/2013 | Comb et al. | |
| 2014/0283699 A1 | 9/2014 | Eyal et al. | |
| 2016/0046076 A1 * | 2/2016 | Huang | B29C 64/129 700/98 |
| 2017/0145202 A1 * | 5/2017 | Sparks | B29B 7/7457 |
| 2017/0291362 A1 | 10/2017 | Tombs et al. | |
| 2017/0355135 A1 | 12/2017 | Tombs | |

OTHER PUBLICATIONS

Measurement Specialties Technical Paper, "The LVDT: construction and principle of operation" (http://www.meas-spec.com/downloads/Principles_of_the_LVDT.pdf).

* cited by examiner

*Primary Examiner* — Monica A Huson
*Assistant Examiner* — Kelsey C Grace
(74) *Attorney, Agent, or Firm* — Kevin E. Spaulding; David A. Novais

(57) ABSTRACT

A method for printing a three-dimensional part includes receiving a sequence of part layer patterns together with first and second complementary mask patterns. For each part layer pattern in the sequence of part layer patterns, a mask pattern is selected according to the layer number of the part layer pattern, wherein the first mask pattern is selected for odd layer numbers and the second mask pattern is selected for even layer numbers. A masked part layer is formed by applying the selected mask pattern to the part layer pattern. A developed part layer is formed using an electrophotography engine, and the developed part layer is transfused together to previously-printed part layers to form a printed part layer of the three-dimensional part.

14 Claims, 14 Drawing Sheets

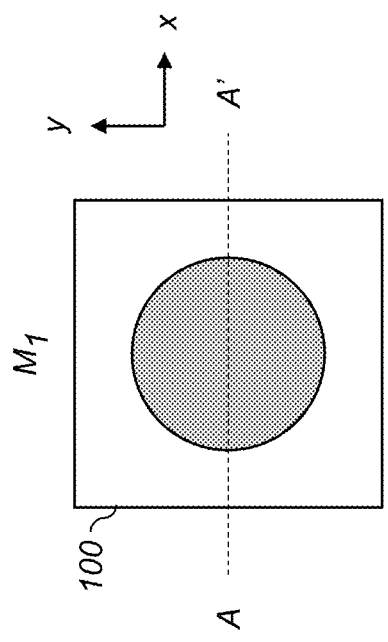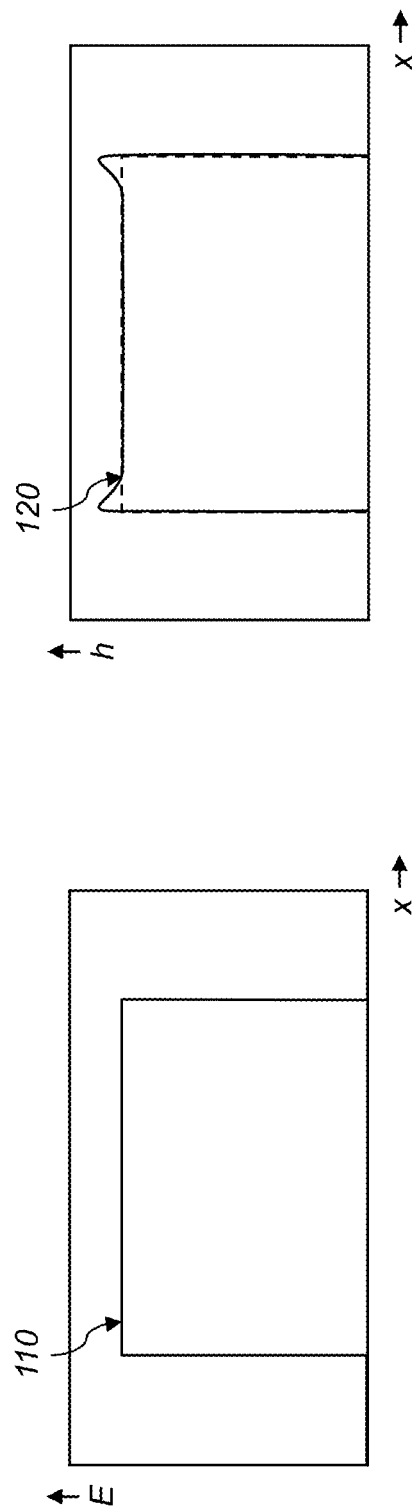
FIG. 5A (Prior Art)
FIG. 5B (Prior Art)
FIG. 5C (Prior Art)

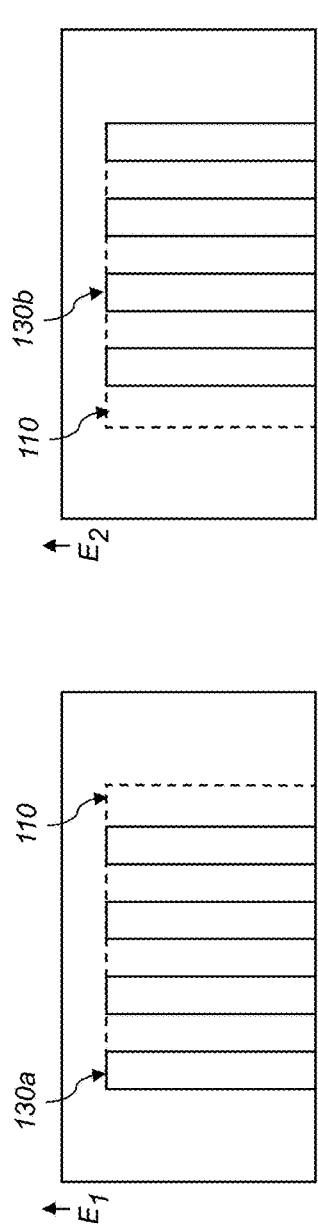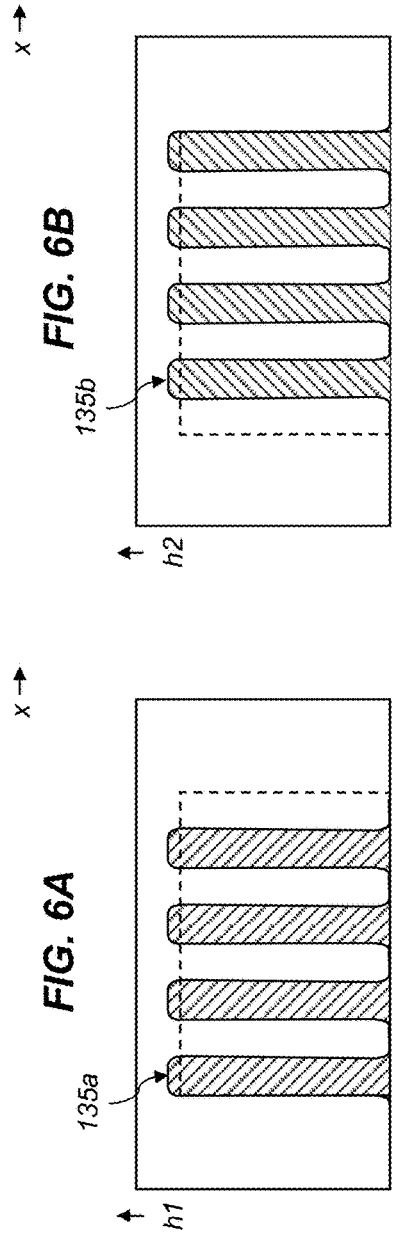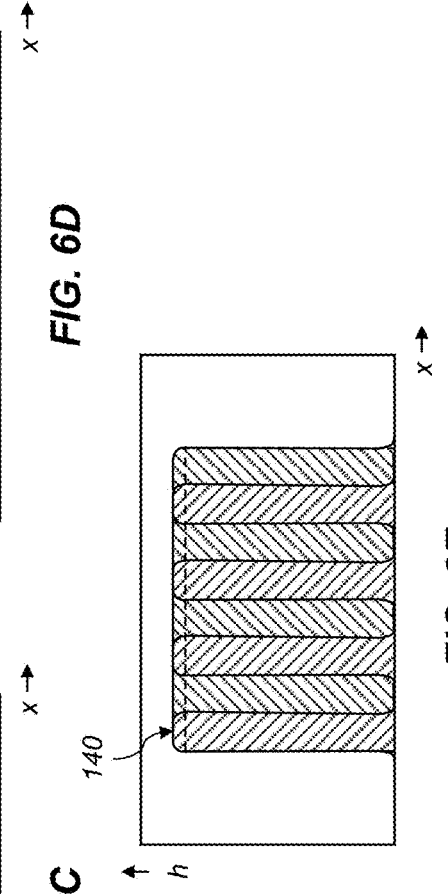

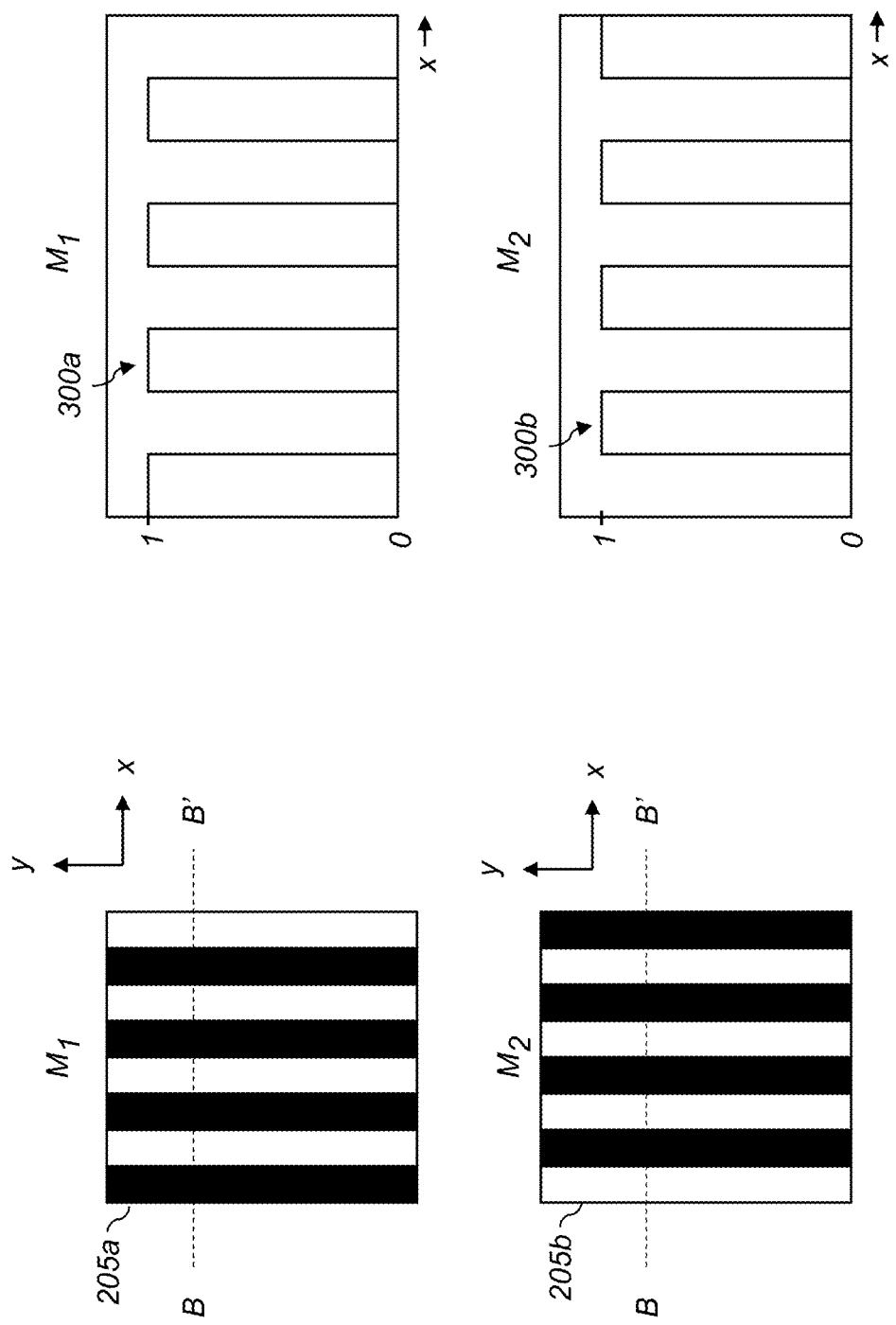

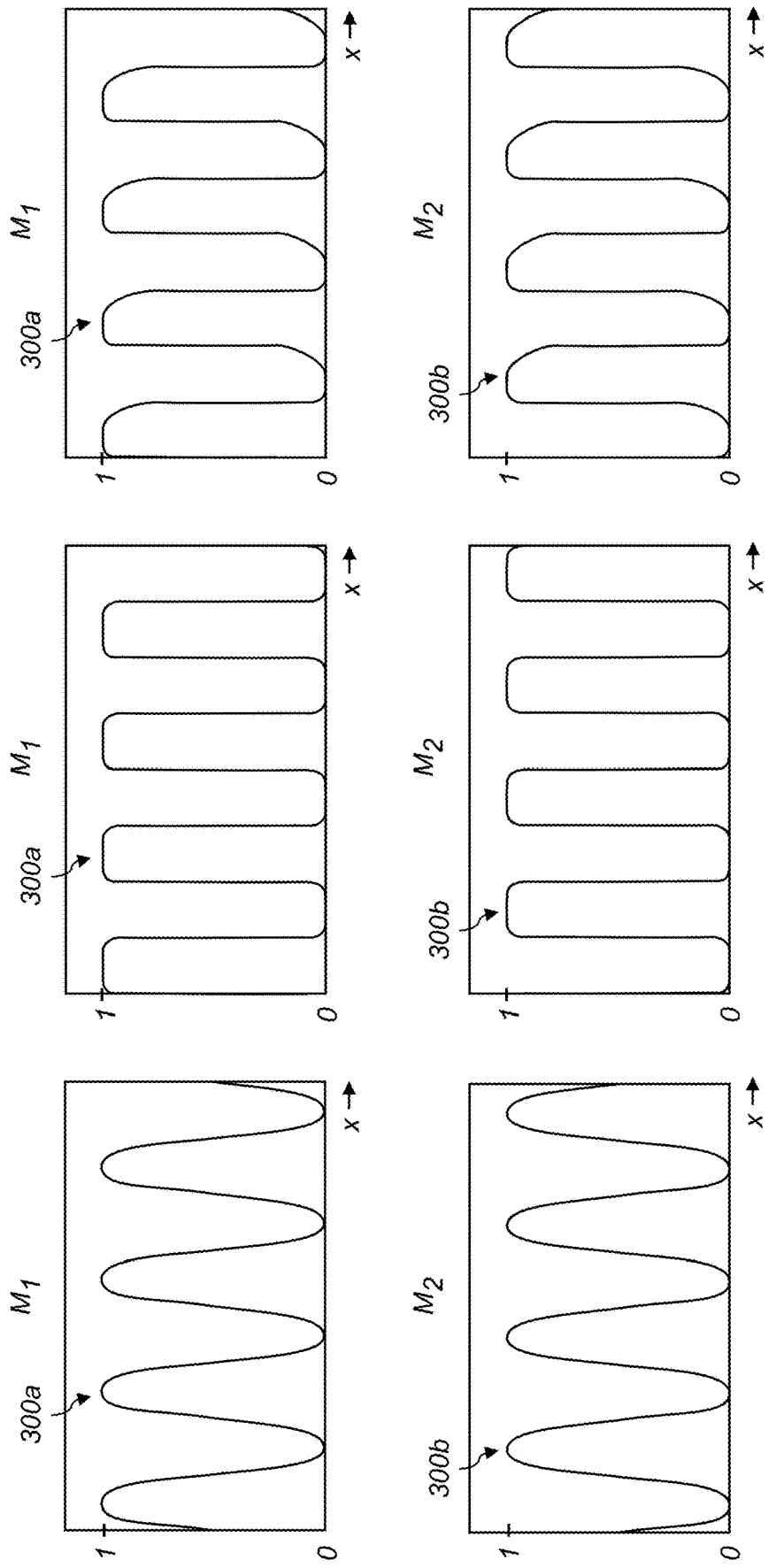

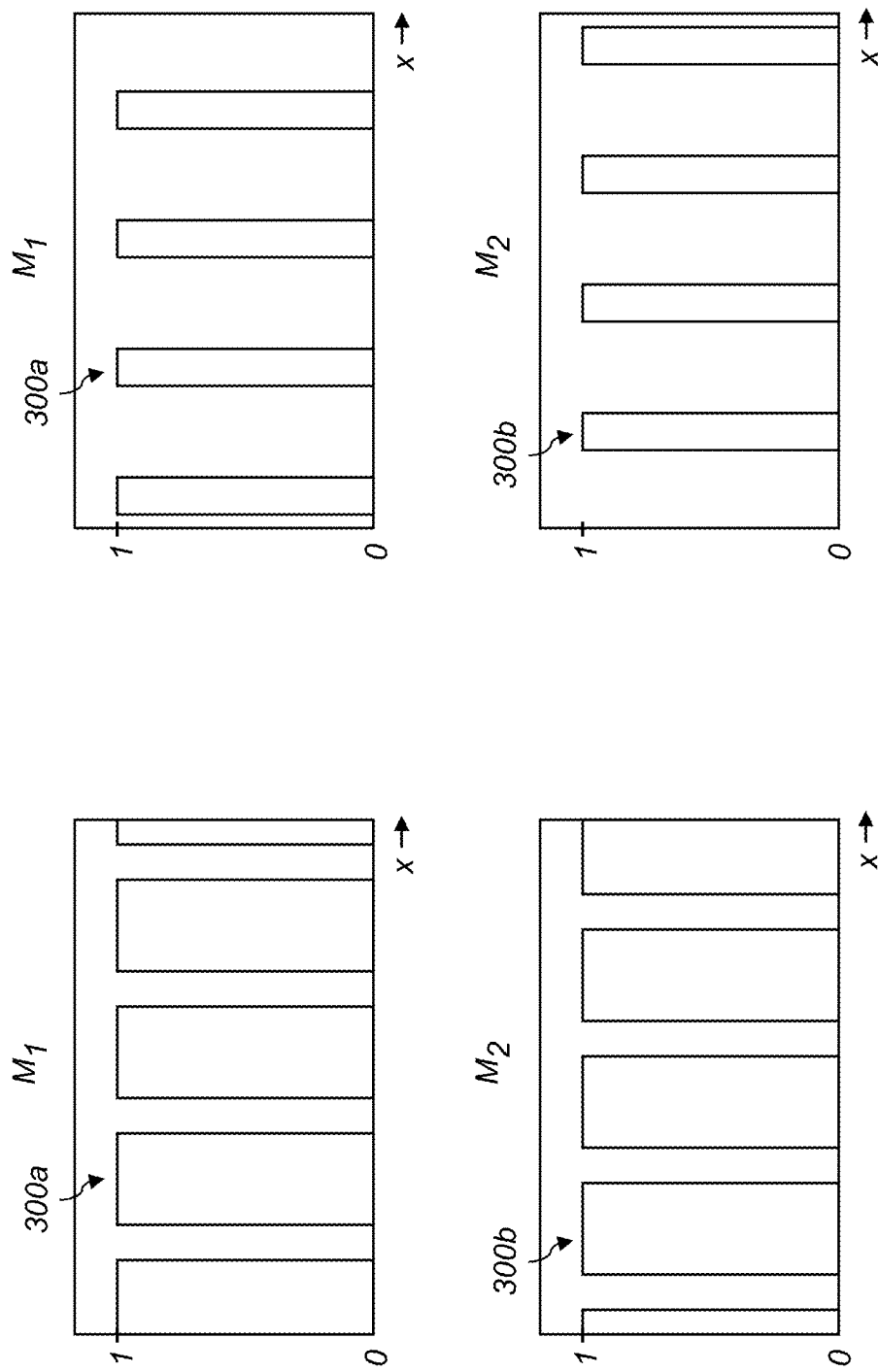

ELECTROPHOTOGRAPHY-BASED 3D PRINTING WITH IMPROVED LAYER UNIFORMITY

FIELD OF THE INVENTION

This invention pertains to the field of electrophotography-based additive manufacturing systems for printing three-dimensional parts, and more particularly to a method for mitigating electrophotographic edge effects.

BACKGROUND OF THE INVENTION

Additive manufacturing systems are used to build three-dimensional (3D) parts from digital representations of the 3D parts using one or more additive manufacturing techniques. Common forms of such digital representations would include the well-known AMF and STL file formats. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into a plurality of horizontal layers. For each sliced layer, a tool path is then generated, that provides instructions for the particular additive manufacturing system to form the given layer.

For example, in an extrusion-based additive manufacturing system, a 3D part (sometimes referred to as a 3D model) can be printed from the digital representation of the 3D part in a layer-by-layer manner by extruding a flowable part material. The part material is extruded through an extrusion tip carried by a printhead of the system, and is deposited as a sequence of layers on a substrate in an x-y plane. The extruded part material fuses to previously deposited part material, and solidifies upon a drop in temperature. The position of the printhead relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry defining the support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (also known as xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where part material is applied to charged areas, or alternatively to discharged areas of the photoconductive insulator to form visible images. The formed part material images are then transferred to substrates (e.g., printing paper) and affixed to the substrates with heat and/or pressure.

U.S. Pat. No. 9,144,940 (Martin), entitled "Method for printing 3D parts and support structures with electrophotography-based additive manufacturing," describes an electrophotography-based additive manufacturing method that is able to make a 3D part using a support material and a part material. The support material compositionally includes a first charge control agent and a first copolymer having aromatic groups, (meth)acrylate-based ester groups, carboxylic acid groups, and anhydride groups. The part material compositionally includes a second charge control agent, and a second copolymer having acrylonitrile units, butadiene units, and aromatic units.

The method described by Martin includes developing a support layer of the support structure from the support material with a first electrophotography engine, and transferring the developed support layer from the first electrophotography engine to a transfer medium. The method further includes developing a part layer of the 3D part from the part material with a second electrophotography engine, and transferring the developed part layer from the second electrophotography engine to the transfer medium. The developed part and support layers are then moved to a layer transfusion assembly with the transfer medium, where they are transfused together to previously-printed layers.

One issue that can arise in electrophotographic printing is that fringe fields are formed around the edges of features during the development process. This can result a non-uniform laydown of part material particles around the edges of what should be a uniform region. When using electrophotographic printing systems to perform 3D printing, this produces a non-uniform layer thickness, resulting in inaccurate part dimensions. There remains a need for an improved method for printing a three-dimensional part with an electrophotography-based additive manufacturing system to improve the uniformity of layer thickness near the edges of a part.

SUMMARY OF THE INVENTION

The present invention represents a method for printing a three-dimensional part with an electrophotography-based additive manufacturing system, including:
- receiving a sequence of part layer patterns defining the three-dimensional part to be printed, each part layer pattern having an associated layer number;
- receiving first and second mask patterns, wherein the second mask pattern is complementary to the first mask pattern;
- for each part layer pattern in the sequence of part layer patterns:
    - selecting a mask pattern according to the layer number of the part layer pattern, wherein the first mask pattern is selected for odd layer numbers and the second mask pattern is selected for even layer numbers;
    - forming a masked part layer by applying the selected mask pattern to the part layer pattern;
    - developing a developed part layer of the three-dimensional part with an electrophotography engine using the masked part layer;
    - transfusing the developed part layer together to previously-printed part layers to form a printed part layer of the three-dimensional part.

This invention has the advantage that it mitigates the formation of layer thickness variations near edges of part layer features that are associated with fringe fields in the electrophotographic development process.

It has the further advantage that it reduces the likelihood of artifacts caused by the incomplete or incorrect transfusion of a part layer due to thickness non-uniformities in the previously printed layers.

It has the additional advantage that the layer thickness is more consistent with different types of part layer geometries.

BRIEF DESCRIPTION OF THE DRAWINGS

FIGS. 5A-5C illustrate layer thickness non-uniformities resulting from fringe field effects;

FIGS. 6A-6E illustrate a method for mitigating the effects of fringe field effects by applying a set of mask patterns to a part layer in accordance with the present invention;

FIG. 9A illustrates an exemplary pair of complementary linear mask patterns;

FIG. 9B shows cross-sections through the mask patterns of FIG. 9A;

FIGS. 10A-10E illustrate other exemplary pairs of complementary mask patterns.

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
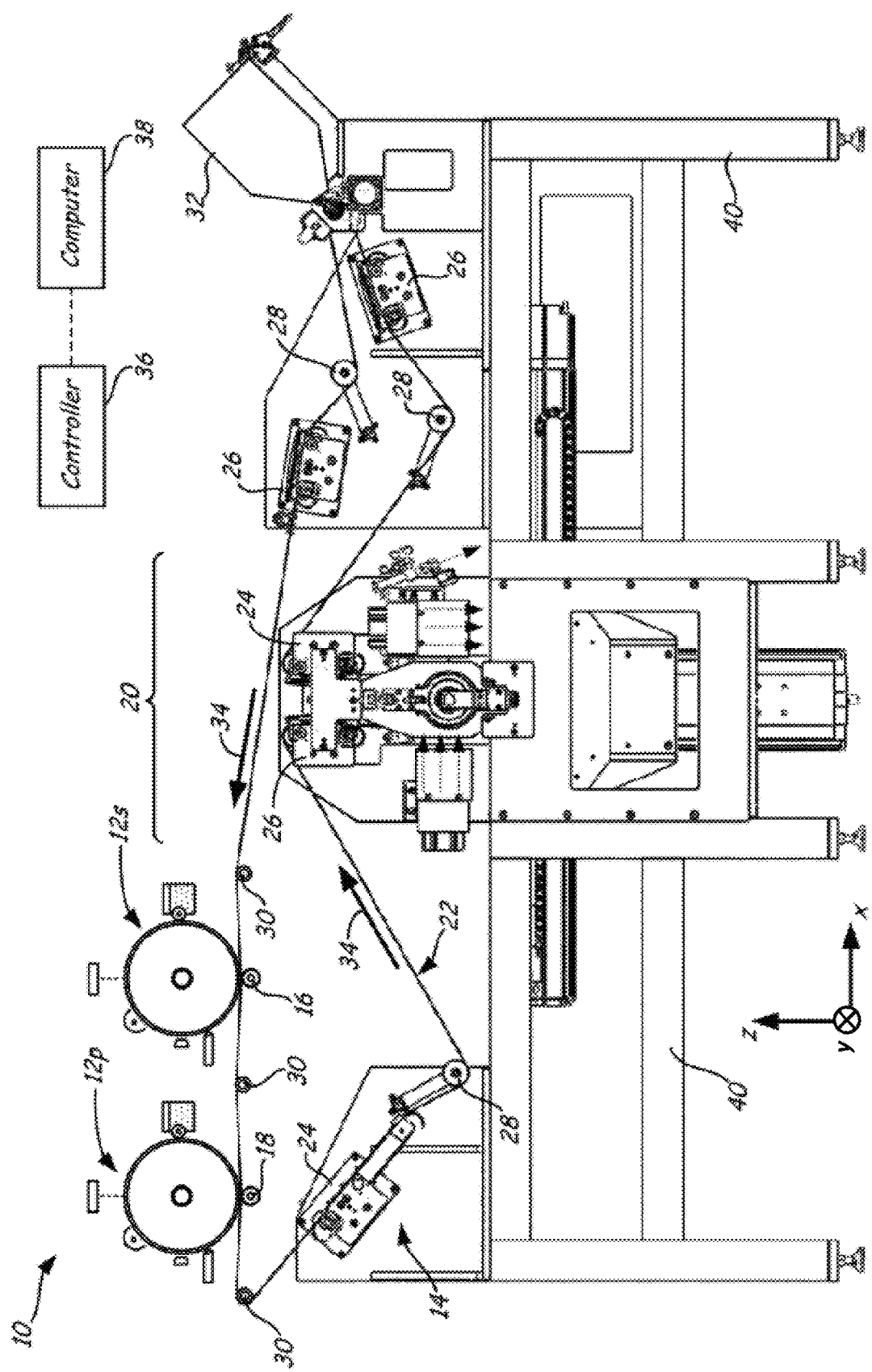
FIG. 1 is a schematic front view of an exemplary electrophotography-based additive manufacturing system for printing 3D parts and support structures from part and support materials.

FIGS. 1-4 illustrate an exemplary additive manufacturing system 10, which uses an electrophotography-based additive manufacturing process for printing 3D parts from a part material (e.g., an ABS part material), and associated support structures from a removable support material. As shown in FIG. 1, additive manufacturing system 10 includes a pair of electrophotography (EP) engines 12$p$ and 12$s$, belt transfer assembly 14, biasing mechanisms 16 and 18, and layer transfusion assembly 20.

Examples of suitable components and functional operations for additive manufacturing system 10 include those disclosed in U.S. Patent Application Publication No. 2013/0077996 (Hanson et al.), entitled "Electrophotography-based additive manufacturing system with reciprocating operation;" in U.S. Patent Application Publication No. 2013/0077997 (Hanson et al.), entitled "Electrophotography-based additive manufacturing system with transfer-medium service loop;" in U.S. Patent Application Publication No. 2013/0186549 (Comb et al.), entitled "Layer transfusion for additive manufacturing;" and in U.S. Patent Application Publication No. 2013/0186558 (Comb et al.), entitled "Layer transfusion with heat capacitor belt for additive manufacturing," each of which is incorporated herein by reference.

EP engines 12$p$ and 12$s$ are imaging engines for respectively imaging or otherwise developing layers of the part and support materials, where the part and support materials are each preferably engineered for use with the particular architecture of EP engine 12$p$ and 12$s$. The part material compositionally includes part material particles, and the support compositionally includes support material particles. In an exemplary embodiment, the support material compositionally includes support material particles including a first charge control agent and a first copolymer having aromatic groups, (meth)acrylate-based ester groups, carboxylic acid groups, and anhydride groups; and the part material compositionally includes part material particles including a second charge control agent, and a second copolymer having acrylonitrile units, butadiene units, and aromatic units. As discussed below, the developed part and support layers are transferred to belt transfer assembly 14 (or some other appropriate transfer medium) with biasing mechanisms 16 and 18, and carried to the layer transfusion assembly 20 to produce the 3D parts and associated support structures in a layer-by-layer manner.

In the illustrated configuration, belt transfer assembly 14 includes transfer belt 22, which serves as the transfer medium, belt drive mechanisms 24, belt drag mechanisms 26, loop limit sensors 28, idler rollers 30, and belt cleaner 32, which are configured to maintain tension on the transfer belt 22 while transfer belt 22 rotates in rotational direction 34. In particular, the belt drive mechanisms 24 engage and drive the transfer belt 22, and the belt drag mechanisms 26 function as brakes to provide a service loop design for protecting the transfer belt 22 against tension stress, based on monitored readings from the loop limit sensors 28.

Additive manufacturing system 10 also includes a controller 36, which includes one or more control circuits, microprocessor-based engine control systems, or digitally-controlled raster imaging processor systems, and which is configured to operate the components of additive manufacturing system 10 in a synchronized manner based on printing instructions received from a host computer 38. Host computer 38 includes one or more computer-based systems configured to communicate with controller 36 to provide the print instructions (and other operating information). For example, host computer 38 can transfer information to controller 36 that relates to the individual layers of the 3D parts and support structures, thereby enabling additive manufacturing system 10 to print the 3D parts and support structures in a layer-by-layer manner.

The components of additive manufacturing system 10 are typically retained by one or more frame structures, such as frame 40. Additionally, the components of additive manufacturing system 10 are preferably retained within an enclosable housing (not shown) that prevents ambient light from being transmitted to the components of additive manufacturing system 10 during operation.

Figure 2:
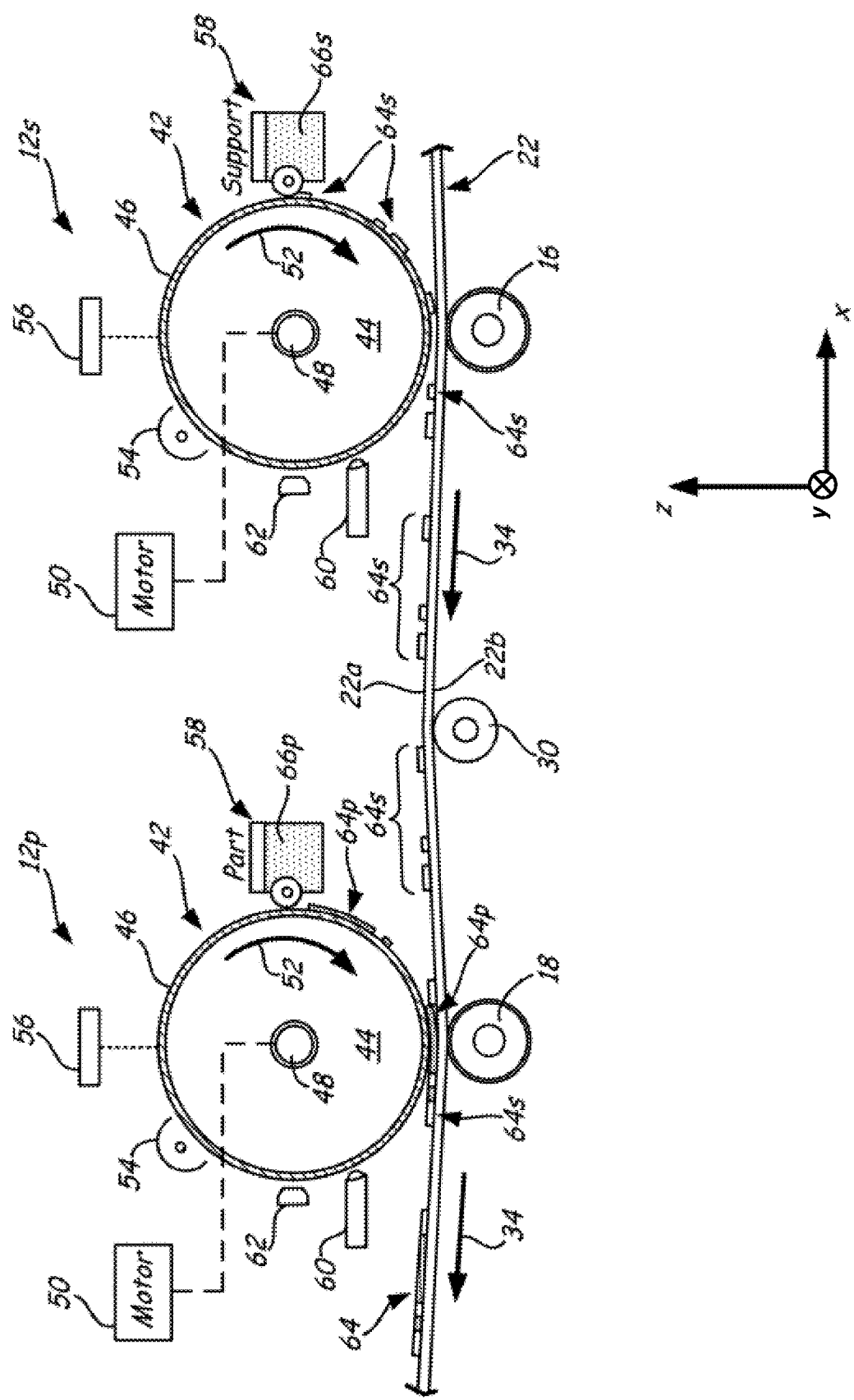
FIG. 2 is a schematic front view showing additional details of the electrophotography engines in the additive manufacturing system of FIG. 1.

FIG. 2 illustrates EP engines 12p and 12s in additional detail. EP engine 12s (i.e., the upstream EP engine relative to the rotational direction 34 of transfer belt 22) develops layers of support material 66s, and EP engine 12p (i.e., the downstream EP engine relative to the rotational direction 34 of transfer belt 22) develops layers of part material 66p. In alternative configurations, the arrangement of EP engines 12p and 12s can be reversed such that EP engine 12p is upstream from EP engine 12s relative to the rotational direction 34 of transfer belt 22. In other alternative configuration, additive manufacturing system 10 can include one or more additional EP engines for printing layers of additional materials.

In the illustrated configuration, EP engines 12p and 12s utilize identical components, including photoconductor drums 42, each having a conductive drum body 44 and a photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate the shaft 48 (and the photoconductor drum 42) in rotation direction 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, photoconductive surface 46 is configured to receive latent-charged images of the sliced layers of a 3D part or support structure (or negative images), and to attract charged particles of the part or support material of the present disclosure to the charged (or discharged image areas), thereby creating the layers of the 3D part and support structures.

As further shown, EP engines 12p and 12s also include charging device 54, imager 56, development station 58, cleaning station 60, and discharge device 62, each of which is in signal communication with controller 36. Charging device 54, imager 56, development station 58, cleaning station 60, and discharge device 62 accordingly define an image-forming assembly for surface 46 while drive motor 50 and shaft 48 rotate photoconductor drum 42 in the rotation direction 52.

In the illustrated example, the image-forming assembly for photoconductive surface 46 of EP engine 12s is used to form support material layers 64s of support material 66s, where a supply of support material 66s is retained by development station 58 of EP engine 12s, along with associated carrier particles. Similarly, the image-forming assembly for photoconductive surface 46 of EP engine 12p is used to form part material layers 64p of part material part material 66p, where a supply of part material 66p is retained by development station 58 of EP engine 12p, along with associated carrier particles. Charging device 54 is configured to provide a uniform electrostatic charge on the photoconductive surface 46 as the photoconductive surface 46 rotates in the rotation direction 52 past the charging device 54. Suitable devices that can be used for the charging device 54 include corotrons, scorotrons, charging rollers, and other electrostatic devices.

Imager 56 is a digitally-controlled, pixel-wise light exposure apparatus configured to selectively emit electromagnetic radiation toward the uniform electrostatic charge on the photoconductive surface 46 as the photoconductive surface 46 rotates in the rotation direction 52 past the imager 56. The selective exposure of the electromagnetic radiation on the photoconductive surface 46 is controlled by the controller 36, and causes discrete pixel-wise locations of the electrostatic charge to be removed (i.e., discharged to ground), thereby forming latent image charge patterns on the photoconductive surface 46. The imager 56 in the EP engine 12p is controlled to provide a latent image charge pattern in accordance with a specified pattern for a particular part material layer 64p, and the imager 56 in the EP engine 12s is controlled to provide a latent image charge pattern in accordance with a specified pattern for a corresponding support material layer 64s.

Suitable devices for imager 56 include scanning laser light sources (e.g., gas or solid state lasers), light emitting diode (LED) array exposure devices, and other exposure device conventionally used in 2D electrophotography systems. In alternative embodiments, suitable devices for charging device 54 and imager 56 include ion-deposition systems configured to selectively deposit charged ions or electrons directly to the photoconductive surface 46 to form the latent image charge pattern. As such, as used herein, the term "electrophotography" includes "ionography."

Each development station 58 is an electrostatic and magnetic development station or cartridge that retains the supply of part material 66p or support material 66s, preferably in powder form, along with associated carrier particles. The development stations 58 typically function in a similar manner to single or dual component development systems and toner cartridges used in 2D electrophotography systems. For example, each development station 58 can include an enclosure for retaining the part material 66p or support material 66s and carrier particles. When agitated, the carrier particles generate triboelectric charges to attract the part material particles of the part material 66p or the support material particles of the support material 66s, which charges the attracted particles to a desired sign and magnitude, as discussed below.

Each development station 58 typically include one or more devices for transferring the charged part material 66p or support material 66s to the photoconductive surface 46, such as conveyors, fur brushes, paddle wheels, rollers or magnetic brushes. For instance, as the photoconductive surface 46 (having the latent image charge pattern) rotates past the development station 58 in the rotation direction 52, the particles of charged part material 66p or support material 66s are attracted to the appropriately charged regions of the latent image on the photoconductive surface 46, utilizing either charged area development or discharged area development (depending on the electrophotography mode being utilized). This creates successive part material layers 64p and support material layers 64s as the photoconductor drum 42 continues to rotate in the rotation direction 52, where the successive part material layers 64p and support material layers 64s correspond to the successive sliced layers of the digital representation of the 3D part and support structures.

The successive part material layers 64p and support material layers 64s are then rotated with photoconductive surfaces 46 in the rotation direction 52 to a transfer region in which the part material layers 64p and support material layers 64s are successively transferred from the photoconductor drums 42 to the transfer belt 22, as discussed below. While illustrated as a direct engagement between photoconductor drum 42 and transfer belt 22, in some preferred embodiments, EP engines 12p and 12s may also include intermediary transfer drums or belts, as discussed further below. The EP engines 12p and 12s are configured so that the part material layers 64p are transferred onto the transfer belt in registration with the corresponding support material layers 64s to provide combined layers 64.

After a given part material layer 64p or support material layer 64s is transferred from the photoconductor drum 42 to the transfer belt 22 (or an intermediary transfer drum or belt), drive motor 50 and shaft 48 continue to rotate the photoconductor drum 42 in the rotation direction 52 such that the region of the photoconductive surface 46 that previously held the developed layer passes the cleaning station 60. The cleaning station 60 is configured to remove any residual, non-transferred portions of part material 66p or support material 66s from the photoconductive surface 46. Suitable types of cleaning devices for use in the cleaning station 60 include blade cleaners, brush cleaners, electrostatic cleaners, vacuum-based cleaners, and combinations thereof.

After passing the cleaning station 60, the photoconductive surface 46 continues to rotate in the rotation direction 52 such that the cleaned regions of the photoconductive surface 46 pass by the discharge device 62 to remove any residual electrostatic charge on photoconductive surface 46 prior to starting the next cycle. Suitable types of discharge devices 62 include optical systems, high-voltage alternating-current corotrons and/or scorotrons, one or more rotating dielectric rollers having conductive cores with applied high-voltage alternating-current, and combinations thereof.

The transfer belt 22 is a transfer medium for transporting the developed part material layers 64p and support material layers 64s from photoconductor drum 42 (or an intermediary transfer drum or belt) to the layer transfusion assembly 20 (FIG. 1). Examples of suitable types of transfer belts 22 include those disclosed in Comb et al. in the aforementioned U.S. Patent Application Publication No. 2013/0186549 and U.S. Patent Application Publication No. 2013/0186558 by Comb et al. The transfer belt 22 includes a front surface 22a and a rear surface 22b, where the front surface 22a faces the photoconductive surfaces 46 of photoconductor drums 42 and the rear surface 22b is in contact with biasing mechanisms 16 and 18.

Biasing mechanisms 16 and 18 are configured to induce electrical potentials through transfer belt 22 to electrostatically attract the part material layers 64p and support material layers 64s from EP engines 12p and 12s, respectively, to the transfer belt 22. Because the part material layers 64p and support material layers 64s each represent only a single layer increment in thickness at this point in the process, electrostatic attraction is suitable for transferring the part material layers 64p and support material layers 64s from the EP engines 12p and 12s to the transfer belt 22.

Preferably, the controller 36 rotates the photoconductor drums 42 of EP engines 12p and 12s at the same rotational rates, such that the tangential velocity of the photoconductive surfaces 46 are synchronized with the line speed of the transfer belt 22 (as well as with any intermediary transfer drums or belts). This allows the additive manufacturing system 10 to develop and transfer the part material layers 64p and support material layers 64s in coordination with each other from separate developed images. In particular, as shown, each part material layer 64p is transferred to transfer belt 22 in proper registration with each support material layer 64s to produce the combined layer 64. As discussed below, this allows the part material layers 64p and support material layers 64s to be transfused together. To enable this, the part material 66p and support material 66s preferably have thermal properties and melt rheologies that are the same or substantially similar. Within the context of the present invention, "substantially similar thermal properties and melt rheologies" should be interpreted to be within 20% of regularly measured properties such as glass transition temperature, melting point and melt viscosity. As can be appreciated, some combined layers 64 transported to layer transfusion assembly 20 may only include support material 66s or may only include part material 66p, depending on the particular support structure and 3D part geometries and layer slicing.

In an alternative and generally less-preferred configuration, part material layers 64p and support material layers 64s may optionally be developed and transferred along transfer belt 22 separately, such as with alternating part material layers 64p and support material layers 64s. These successive, alternating layers 64p and 64s may then be transported to layer transfusion assembly 20, where they may be transfused separately to print the 3D part and support structure.

Figure 3:
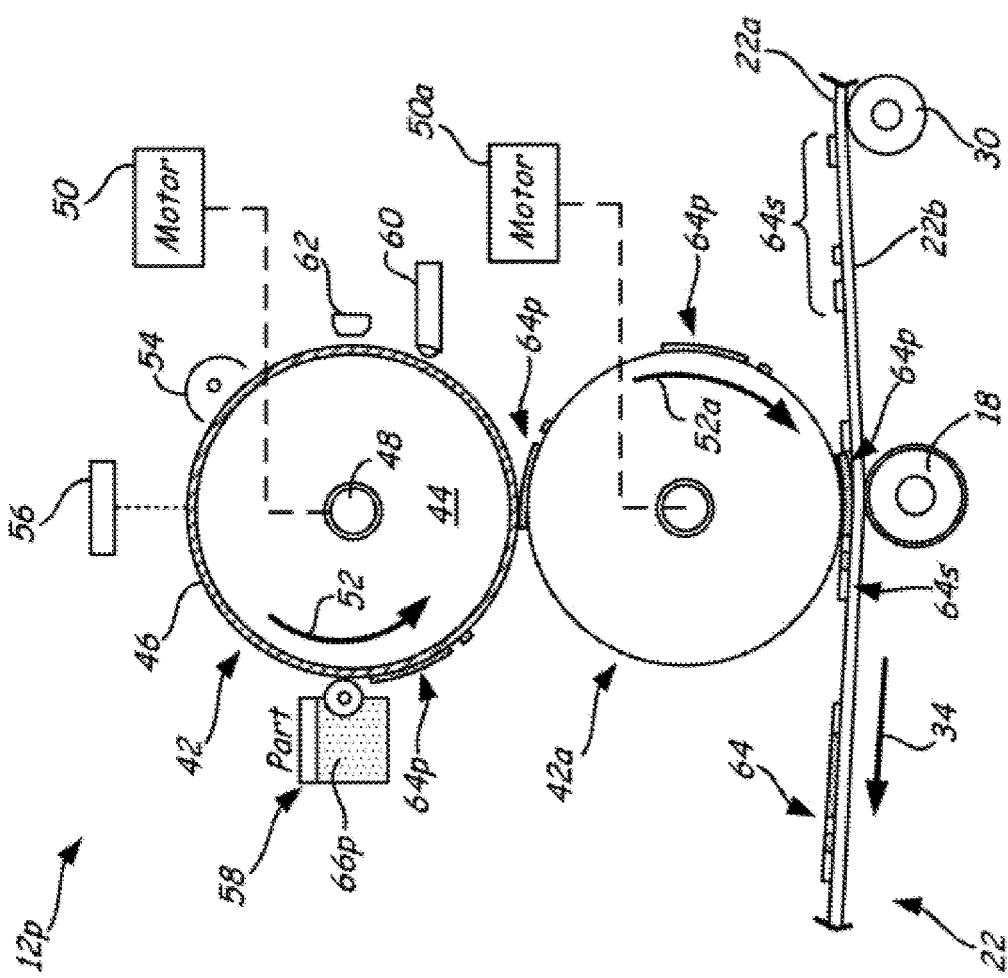
FIG. 3 is a schematic front view showing an alternative electrophotography engine, which includes an intermediary drum or belt.

In some configurations, one or both of EP engines 12p and 12s can also include one or more intermediary transfer drums or belts between the photoconductor drum 42 and the transfer belt 22. For example, FIG. 3 illustrates an alternate configuration for an EP engine 12p that also includes an intermediary drum 42a. The intermediary drum 42a rotates in a rotation direction 52a opposite to the rotation direction 52, under the rotational power of drive motor 50a. Intermediary drum 42a engages with photoconductor drum 42 to receive the developed part material layers 64p from the photoconductor drum 42, and then carries the received part material layers 64p and transfers them to the transfer belt 22.

In some configurations, the EP engine 12s (FIG. 2) can use a same arrangement using an intermediary drum 42a for carrying the developed support material layers 64s from the photoconductor drum 42 to the transfer belt 22. The use of such intermediary transfer drums or belts for EP engines 12p and 12s can be beneficial for thermally isolating the photoconductor drum 42 from the transfer belt 22, if desired.

Figure 4:
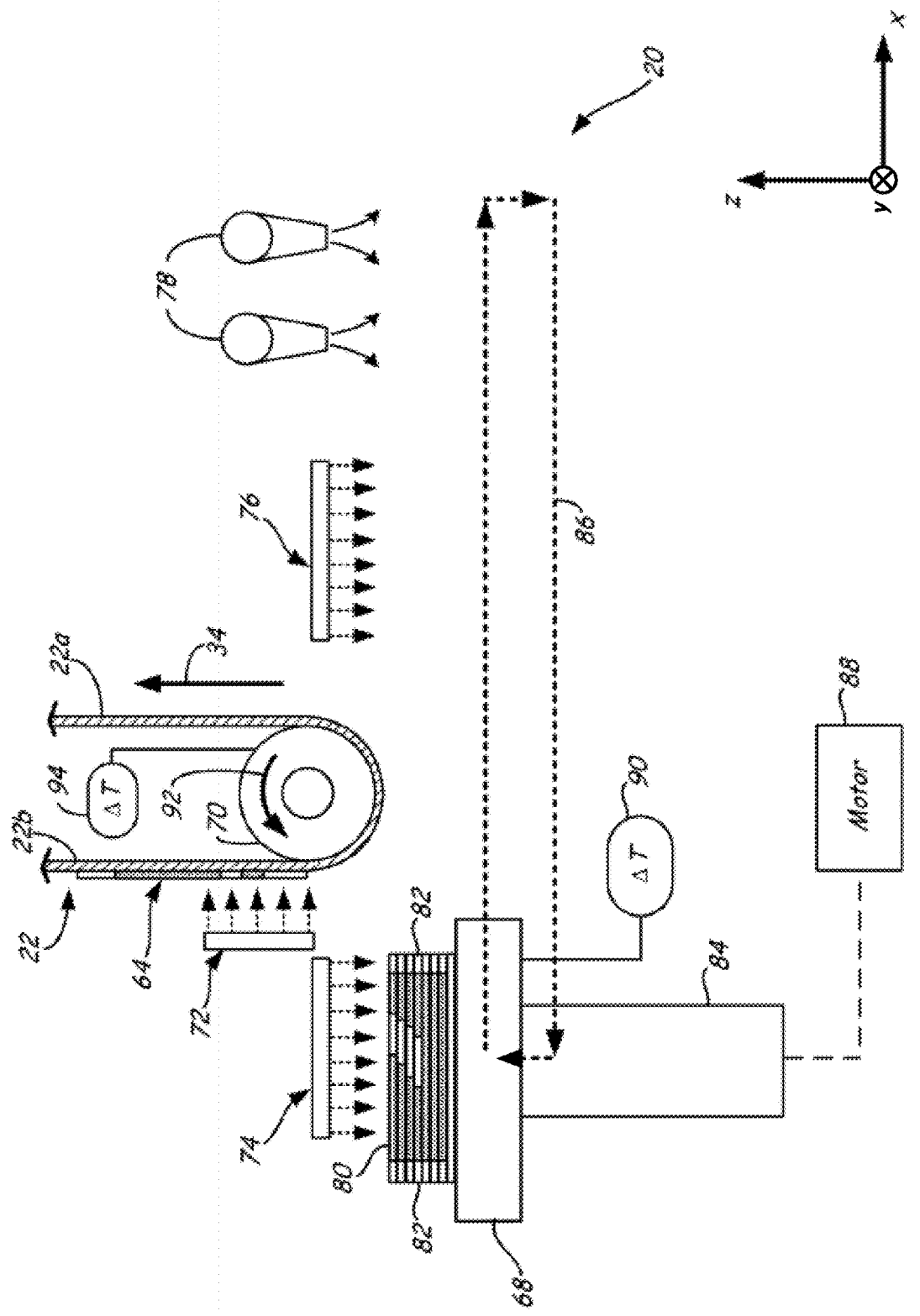
FIG. 4 is a schematic front view illustrating a layer transfusion assembly for performing layer transfusion steps.

FIG. 4 illustrates an exemplary configuration for the layer transfusion assembly 20. In the illustrated embodiment, the layer transfusion assembly uses a heating process to fuse the combined layer 64 to the previously printed layers of the 3D part 80 and support structure 82. In other embodiments, the layer transfusion assembly 20 can use other types of transfusion processes to perform the fusing operation. For example, a solvent process can be used to soften the part material 66p and the support material 66s so that they can be fused to the previously printed layers of the 3D part 80 and support structure 82 by pressing them together.

As shown, the layer transfusion assembly 20 includes build platform 68, nip roller 70, heaters 72 and 74, post-fuse heater 76, and air jets 78 (or other cooling units). Build platform 68 is a platform assembly or platen that is configured to receive the heated combined layers 64 (or separate part material layers 64p and support material layers 64s) for printing a 3D part 80 and support structure 82, in a layerby-layer manner. In some configurations, the build platform 68 may include removable film substrates (not shown) for receiving the combined layers 64, where the removable film substrates may be restrained against build platform using any suitable technique (e.g., vacuum drawing, removable adhesive, mechanical fastener, and the like).

The build platform 68 is supported by gantry 84, which is a gantry mechanism configured to move build platform 68 along the z-axis and the x-axis in a reciprocating rectangular motion pattern 86, where the primary motion is back-and-forth along the x-axis. Gantry 84 may be operated by a motor 88 based on commands from the controller 36, where the motor 88 can be an electrical motor, a hydraulic system, a pneumatic system, or the like.

In the illustrated configuration, the build platform 68 is heatable with heating element 90 (e.g., an electric heater). Heating element 90 is configured to heat and maintain the build platform 68 at an elevated temperature that is greater than room temperature (e.g., about 25° C.), such as at a desired average part temperature of 3D part 80 and support structure 82, as discussed by Comb et al. in the aforementioned U.S. Patent Application Publication No. 2013/0186549 and U.S. Patent Application Publication No. 2013/0186558. This allows build platform 68 to assist in maintaining the 3D part 80 and support structure 82 at the desired average part temperature.

Nip roller 70 is a heatable element or a heatable layer transfusion element, which is configured to rotate around a fixed axis with the movement of transfer belt 22. In particular, nip roller 70 may roll against the rear surface 22b in rotation direction 92 while the transfer belt 22 rotates in the rotation direction 34. In the illustrated configuration, nip roller 70 is heatable with heating element 94 (e.g., an electric heater). Heating element 94 is configured to heat and maintain nip roller 70 at an elevated temperature that is greater than the room temperature (e.g., 25° C.), such as at a desired transfer temperature for combined layers 64.

Heater 72 includes one or more heating device (e.g., an infrared heater or a heated air jet) configured to heat the combined layers 64 to a temperature near an intended transfer temperature of the part material 66p and support material 66s, such as at least a fusion temperature of the part material 66p and support material 66s, preferably prior to reaching nip roller 70. Each combined layer 64 preferably passes by (or through) heater 72 for a sufficient residence time to heat the combined layer 64 to the intended transfer temperature. Heater 74 may function in the same manner as heater 72, and heats the top surfaces of 3D part 80 and support structure 82 to an elevated temperature, such as at the same transfer temperature as the heated combined layers 64 (or other suitable elevated temperature).

As mentioned above, the support material 66s used to print support structure 82 preferably has thermal properties (e.g., glass transition temperature) and a melt rheology that are similar to or substantially the same as the thermal properties and the melt rheology of the part material 66p used to print 3D part 80. This enables the part material 66p of the part material layer 64p and the support material 66s of the support material layer 64s to be heated together with heater 74 to substantially the same transfer temperature, and also enables the part material 66p and support material 66s at the top surfaces of 3D part 80 and support structure 82 to be heated together with heater 74 to substantially the same temperature. Thus, the part material layers 64p and the support material layers 64s can be transfused together to the top surfaces of 3D part 80 and support structure 82 in a single transfusion step as combined layer 64. This single transfusion step for transfusing the combined layer 64 is typically impractical without sufficiently matching the thermal properties and the melt rheologies of the part material 66p and support material 66s.

Post-fuse heater 76 is located downstream from nip roller 70 and upstream from air jets 78, and is configured to heat the transfused layers to an elevated temperature to perform a post-fuse or heat-setting operation. Again, the similar thermal properties and melt rheologies of the part and support materials enable the post-fuse heater 76 to post-heat the top surfaces of 3D part 80 and support structure 82 together in a single post-fuse step.

Prior to printing 3D part 80 and support structure 82, build platform 68 and nip roller 70 may be heated to their desired temperatures. For example, build platform 68 may be heated to the average part temperature of 3D part 80 and support structure 82 (due to the similar melt rheologies of the part and support materials). In comparison, nip roller 70 may be heated to a desired transfer temperature for combined layers 64 (also due to the similar thermal properties and melt rheologies of the part and support materials).

During the printing operation, transfer belt 22 carries a combined layer 64 past heater 72, which may heat the combined layer 64 and the associated region of transfer belt 22 to the transfer temperature. Suitable transfer temperatures for the part and support materials include temperatures that exceed the glass transition temperatures of the part material 66p and the support material 66s, which are preferably similar or substantially the same, and where the part material 66p and support material 66s of combined layer 64 are softened but not melted (e.g., to a temperature ranging from about 140° C. to about 180° C. for an ABS part material).

As further shown in the exemplary configuration of FIG. 4, during operation, gantry 84 moves the build platform 68 (with 3D part 80 and support structure 82) in a reciprocating rectangular motion pattern 86. In particular, the gantry 84 moves build platform 68 along the x-axis below, along, or through heater 74. Heater 74 heats the top surfaces of the 3D part 80 and support structure 82 to an elevated temperature, such as the transfer temperatures of the part and support materials. As discussed by Comb et al. in the aforementioned U.S. Patent Application Publication No. 2013/0186549 and U.S. Patent Application Publication No. 2013/0186558, heaters 72 and 74 can heat the combined layers 64 and the top surfaces of the 3D part 80 and support structure 82 to about the same temperatures to provide a consistent transfusion interface temperature. Alternatively, heaters 72 and 74 can heat the combined layers 64 and the top surfaces of the 3D part 80 and support structure 82 to different temperatures to attain a desired transfusion interface temperature.

The continued rotation of transfer belt 22 and the movement of build platform 68 align the heated combined layer 64 with the heated top surfaces of the 3D part 80 and support structure 82 with proper registration along the x-axis. The gantry 84 continues to move the build platform 68 along the x-axis at a rate that is synchronized with the tangential velocity of the transfer belt 22 (i.e., the same directions and speed). This causes rear surface 22b of the transfer belt 22 to rotate around nip roller 70 and brings the heated combined layer 64 into contact with the top surfaces of 3D part 80 and support structure 82. This presses the heated combined layer 64 between the front surface 22a of the transfer belt 22 and the heated top surfaces of 3D part 80 and support structure 82 at the location of nip roller 70, which at least partially transfuses the heated combined layer 64 to the top layers of 3D part 80 and support structure 82.

As the transfused combined layer 64 passes the nip of nip roller 70, the transfer belt 22 wraps around nip roller 70 to separate and disengage the transfer belt from the build platform 68. This assists in releasing the transfused combined layer 64 from the transfer belt 22, enabling the transfused combined layer 64 to remain adhered to the 3D part 80 and the support structure 82, thereby adding a new layer to the 3D part and the support structure 82. Maintaining the transfusion interface temperature at a transfer temperature that is higher than the glass transition temperatures of the part and support materials, but lower than their fusion temperatures, enables the heated combined layer 64 to be hot enough to adhere to 3D part 80 and support structure 82, while also being cool enough to readily release from transfer belt 22. Additionally, as discussed earlier, the similar thermal properties and melt rheologies of the part and support materials allow them to be transfused in the same step.

After release, the gantry 84 continues to move the build platform 68 along the x-axis to the post-fuse heater 76. At the post-fuse heater 76, the top-most layers of 3D part 80 and support structure 82 (including the transfused combined layer 64) are preferably heated to at least the fusion temperature of the part and support materials in a post-fuse or heat-setting step. This melts the part and support materials of the transfused layer 64 to a highly fusible state such that polymer molecules of the transfused layer 64 quickly inter-diffuse to achieve a high level of interfacial entanglement with the 3D part 80 and the support structure 82.

The gantry 84 continues to move the build platform 68 along the x-axis past post-fuse heater 76 to air jets 78, the air jets 78 blow cooling air towards the top layers of 3D part 80 and support structure 82. This actively cools the transfused layer 64 down to the average part temperature, as discussed by Comb et al. in the aforementioned U.S. Patent Application Publication No. 2013/0186549 and U.S. Patent Application Publication No. 2013/0186558.

To assist in keeping 3D part 80 and support structure 82 at the desired average part temperature, in some arrangements, one or both of the heater 74 and post-heater 76 can be configured to operate to heat only the top-most layers of 3D part 80 and support structure 82. For example, in embodiments in which heaters 72, 74, and 76 are configured to emit infrared radiation, 3D part 80 and support structure 82 can include heat absorbers or other colorants configured to restrict penetration of the infrared wavelengths to within only the top-most layers. Alternatively, heaters 72, 74, and 76 can be configured to blow heated air across the top surfaces of 3D part 80 and support structure 82. In either case, limiting the thermal penetration into 3D part 80 and support structure 82 allows the top-most layers to be sufficiently transfused, while also reducing the amount of cooling required to keep 3D part 80 and support structure 82 at the desired average part temperature.

The EP engines 12p and 12s have an associated maximum printable area. For example, the EP engines in the NexPress SX3900 have a maximum printing width in the cross-track direction (i.e., the y-direction) of about 340 mm, and a maximum printing length in the in-track direction (i.e., the x-direction) of about 904 mm. When building a 3D part 80 and support structure 82 having a footprint that is smaller than the maximum printable area of the EP engines 12p and 12s, the gantry 84 next actuates the build platform 68 downward, and moves the build platform 68 back along the x-direction following the reciprocating rectangular motion pattern 86 to an appropriate starting position in the x-direction in proper registration for transfusing the next combined layer 64. In some embodiments, the gantry 84 may also actuate the build platform 68 with the 3D part 80 and support structure 82 upward to bring it into proper registration in the z-direction for transfusing the next combined layer 64. (Generally the upward movement will be smaller than the downward movement to account for the thickness of the previously printed layer.) The same process is then repeated for each layer of 3D part 80 and support structure 82.

In prior art arrangements, the size of the 3D parts 80 that could be fabricated was limited by the maximum printable area of the EP engines 12p and 12s. It would be very costly to develop specially designed EP engines 12p and 12s having maximum printable areas that are larger than those used in typical printing systems. Commonly-assigned, U.S. Pat. No. 10,112,379, entitled "Large format electrophotographic 3D printer," which is incorporated herein by reference, describes methods for using EP engines to produce large parts by printing into a plurality of tile regions on a large build platform.

It has been observed that electrophotography-based additive manufacturing systems are susceptible to artifacts that result from fringe field effects, which are well-known in electrophotography. These artifacts can manifest themselves as non-uniform layer thicknesses near edges in a part layer. To illustrate the formation of such artifacts, consider the exemplary part layer pattern 100 in FIG. 5A. FIG. 5B shows a corresponding exposure pattern cross-section 110 through an exposure pattern provided to the photoconductive surface 46 (FIG. 2) by the imager 56 (FIG. 2) at section line A-A'. When the resulting voltage profile on the photoconductive surface 46 enters the development station 48 (FIG. 2), fringe fields form around the edges of the part, causing the layer thickness (i.e., the height h) to be larger than desired in proximity to the edges of the part as illustrated by the developed part layer cross-section 120 of FIG. 5C. This is due to additional part material being pulled in by the fringe fields. As the part is built up by successively printing many layers, the extra height at the part edges can cause significant dimensional errors. Additionally, the non-uniform layer thickness profiles can produce various artifacts. For example, incomplete or inaccurate transfusion of the developed part layer can occur, particularly in regions away from the edges of the part. This can cause voids in the 3D part or other problems.

To mitigate the artifacts caused by layer thickness variations due to fringe field effects, the present invention applies mask patterns to the part layer patterns. In this way, every portion of the printed part layer is near an edge so that the effect of the fringe fields will uniformly impact the thickness profile across the entire part layer. The fundamental concept involved with the method of the present invention is illustrated in FIGS. 6A-6E. In FIGS. 6A-6B, the exposure pattern cross-section of FIG. 5B is modified using a pair of complementary mask patterns to form masked exposure pattern cross-sections 130a, 103b. The resulting electric field pattern in the development zone of the development station 48 (FIG. 2) is dominated by fringe field effects, resulting in the transfer of more part material than would be transferred away from the edges in the conventional approach discussed earlier with respect to FIG. 5C. The resulting developed part layer cross-sections 135a, 135b are illustrated in FIGS. 6C-6D. When the developed part layer cross-sections 135a, 135b are successively transfused to the previously printed part layers, the voids in the first developed part layer cross-section 135a are filled in by the filled areas in second developed part layer cross-section 135b and vice versa to form a substantially uniform composite part layers cross-section 140 as illustrated in FIG. 6E.

It should be noted that the method of the present invention also reduces layer thickness variations that can conventionally occur for different types of part layer geometries. For example, using conventional methods, features in a part layer having small widths will be dominated by fringe field effects and will therefore print with a larger thickness than features having larger widths. By applying the mask patterns to the part layers, all of the portions of the masked part layer will have similar fringe filed characteristics, and will therefore print with similar layer thicknesses.

Figure 7:
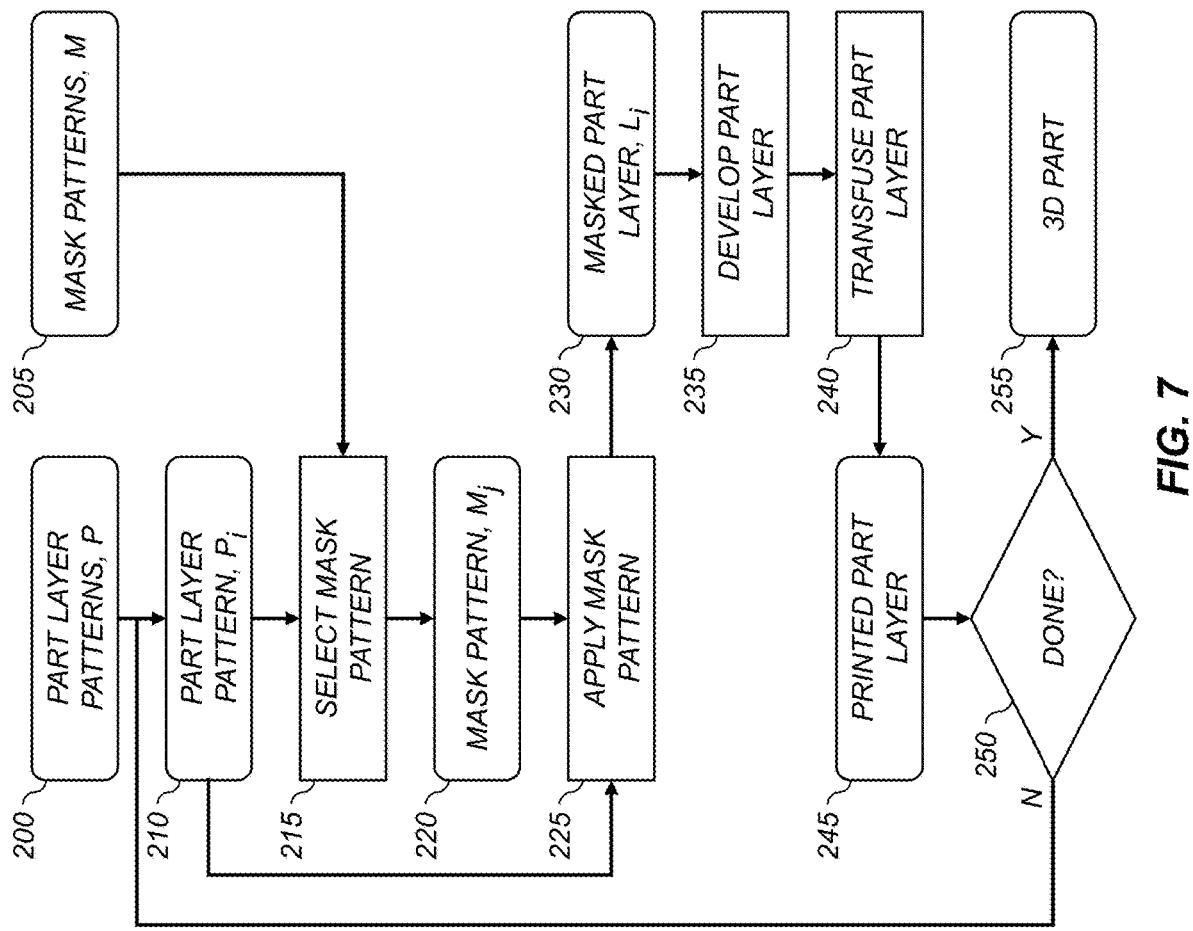
FIG. 7 is a flowchart illustrate a method for printing a three-dimensional part with an electrophotography-based additive manufacturing system in accordance with the present invention.

FIG. 7 shows a flow chart summarizing a method, in accordance with the present invention, for constructing a 3D part 255 from a part material 66p (FIG. 2) using an electrophotography-based additive manufacturing system 10, such as that shown in FIG. 1. It should be recognized that an analogous process can be used to form the 3D support structure 82 (FIG. 4). The inputs to the method are a sequence of part layer patterns 200 and a set of mask patterns 205. Each part layer pattern $P_i$, where i=1–$N_L$ is the layer number, $N_L$ being the number of part layers, defines a shape to be printed for the $i^{th}$ layer of the 3D part 255. The part layer patterns $P_i$ are generally binary 2D patterns defining the locations where part material 66p should be deposited for that layer.

The mask patterns 205 are a set of two or more mask patterns $M_j$, where j=1–$N_M$ is the mask number, $N_M$ being the number of mask patterns. The mask patterns 205 are applied to successive part layers in a repeating sequence. In a preferred embodiment, $N_M$=2 such that the set of mask patterns 205 includes two mask patterns: a first mask pattern $M_1$, and a second mask pattern $M_2$.

The mask patterns 205 are complementary two-dimensional periodic patterns containing filled areas and voids. Within the context of the present invention, two mask patterns are said to be complementary to each other if the filled areas of the first mask pattern $M_1$ are aligned with the voids in the second mask pattern $M_2$ when they are superimposed. Generalizing this to more than two mask patterns 205, a set of mask patterns are said to be complementary if the filled areas in each of the mask patterns $M_j$ are aligned with the voids in the remaining patterns when they are superimposed. Another way to express the idea of the mask patterns 205 being complementary is that the filled areas in the mask patterns 205 mutually supply the voids in the other mask patterns 205.

Generally, the mask patterns 205 will be represented by 2D arrays of pixels. The mask patterns 205 generally have a finite size which is much smaller than the part layer patterns 200. In this case, the mask patterns 205 can be tiled in a repeating pattern to cover the entire spatial extent of the part layer patterns 200 (similar to the way that halftone dither matrices are tiled across an image in well-known dither halftoning processes).

The invention relies on the fact that when the mask patterns 205 are applied over the part layer patterns 200, the features in the resulting masked layer pattern will be dominated by fringe field effects. In a typical electrophotography engine 12p, the fringe fields in the development zone have a spatial extent as large as 10 mm, with the majority of the fringe occurring in the first 100-200 microns. Consequently, the mask patterns 205 should typically have features that are on the order of a few hundred microns or less. Depending on the electrophotography engine 12p and the chemistry of the part material 66p, the size of the fringe field may vary. In such cases, the feature size of the mask can be adjusted accordingly.

Figures 8A, 8B:
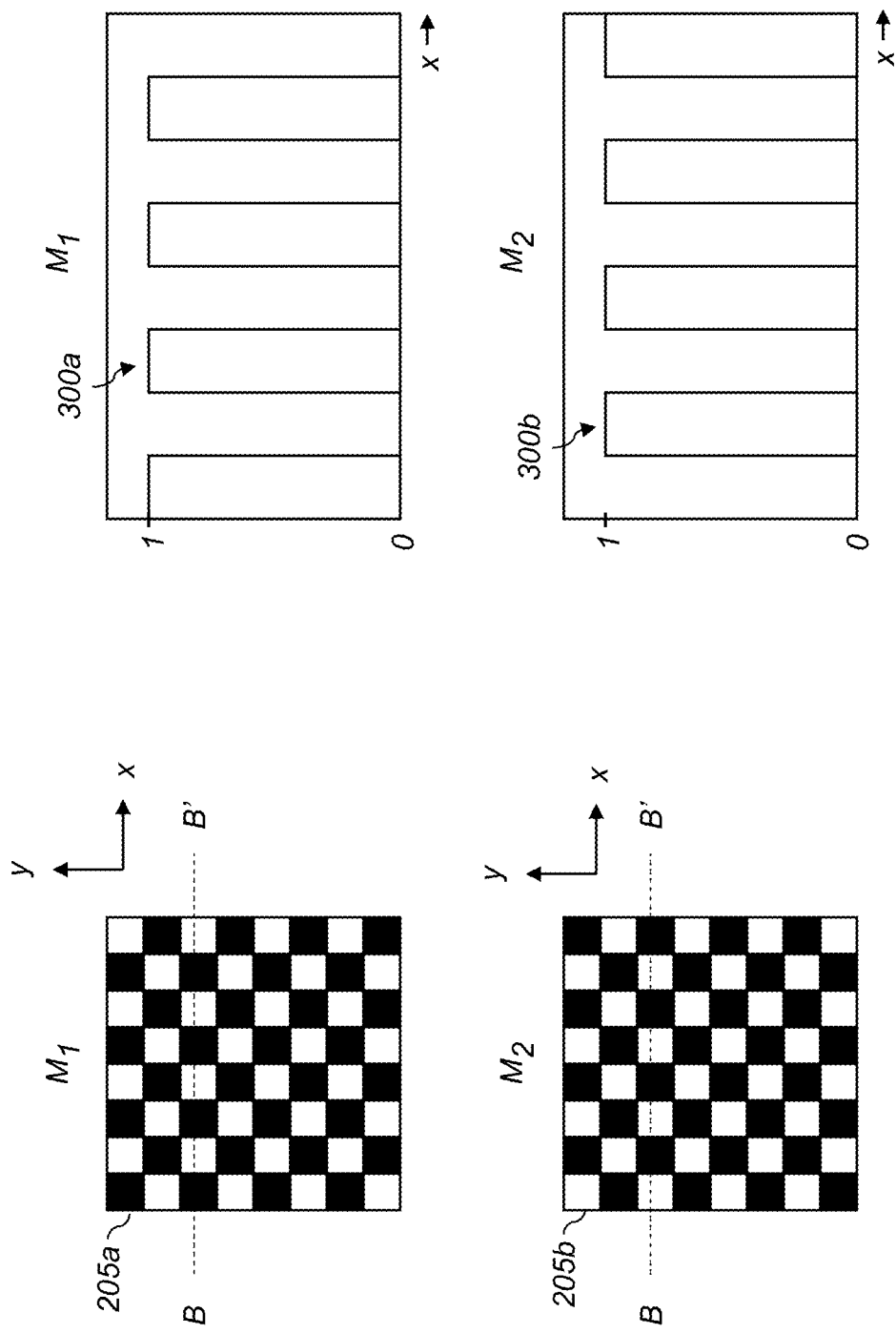
FIG. 8A illustrates an exemplary pair of complementary checkerboard mask patterns.
FIG. 8B shows cross-sections through the mask patterns of FIG. 8A.

In some embodiments using two mask patterns 205, the first and second mask patterns can be mathematical inverses of each other. For example, FIG. 8A illustrates a pair of complementary binary mask patterns 205a, 205b. The first mask pattern 205a ($M_1$) is a binary checkerboard pattern, and the second mask pattern 205b ($M_2$) is a complementary checkerboard pattern where the voids in the first mask pattern 205a have been replaced by filled areas, and the filled areas in the first mask pattern 205a have been replaced by voids.

FIG. 8B shows mask-pattern cross-sections 300a, 300b taken through the mask patterns 205a, 205b, respectively, of FIG. 8A at section line B-B'. It can be seen that where the first mask pattern 205a is high (corresponding to a "filled area"), the second mask pattern 205b is low (corresponding to a "void"), and vice versa.

FIG. 9A illustrates another exemplary pair of complementary binary mask patterns 205a, 205b. In this case, the first mask pattern 205a ($M_1$) is a binary line pattern, and the second mask pattern 205b ($M_2$) is a complementary binary line pattern where the voids in the first mask pattern 205a have been replaced by filled areas, and the filled areas in the first mask pattern 205a have been replaced by voids. In this case, it can be seen that the mask-pattern cross-sections 300a, 300b shown in FIG. 9B corresponding to section lines B-B' are analogous to those shown in FIG. 8B.

While the exemplary mask patterns of FIGS. 8A and 9A are binary, this is not a requirement. For example, FIGS. 10A-10C illustrate exemplary pairs of mask patterns 205a, 205b which have non-binary mask-pattern cross-sections 300a, 300b. These mask-pattern cross-sections 300a, 300b can correspond to line patterns as in FIG. 9A or to cross-sections through two-dimensional patterns, such as the checkerboard patterns of FIG. 8A. The exemplary mask patterns $M_1$, $M_2$ of FIG. 10A have continuously varying shape profiles (e.g., sinusoidal profiles or the like). The exemplary mask patterns $M_1$, $M_2$ of FIG. 10B are analogous to those of FIGS. 8B and 9B except that the filled regions have rounded edges. Similarly, the filled regions of the exemplary mask patterns $M_1$, $M_2$ of FIG. 10C also have rounded edges, where the radius of curvature of the rounded edges are different on the different sides of the filled regions. This can be used to account for the fact that the fringe field effects can sometimes be different on the upstream and downstream edges of a feature.

In the previously discussed exemplary mask patterns 205, the first and second mask patterns 205a, 205b have been arranged such that the sizes of the voids in one mask pattern 205a are matched to the size of the filled regions in the other mask pattern 205b. In this way, when the two patterns are overlaid (e.g., by summing them) they form an approximately uniform pattern. However, this is not a requirement. For example, FIG. 10D illustrates mask-pattern cross-sections 300a, 300b for an exemplary pair of mask patterns $M_1$, $M_2$ where the filled regions in one mask pattern $M_1$ are larger than the corresponding voids in the other mask pattern $M_2$ so that they overlap when the mask patterns $M_1$, $M_2$ are overlaid. Similarly, FIG. 10E illustrates mask-pattern cross-sections 300a, 300b for an exemplary pair of mask patterns $M_1$, $M_2$ where the filled regions in one mask pattern $M_1$ are smaller than the corresponding voids in the other mask pattern $M_2$ so that they leave unfilled areas when they are overlaid.

Figure 11:
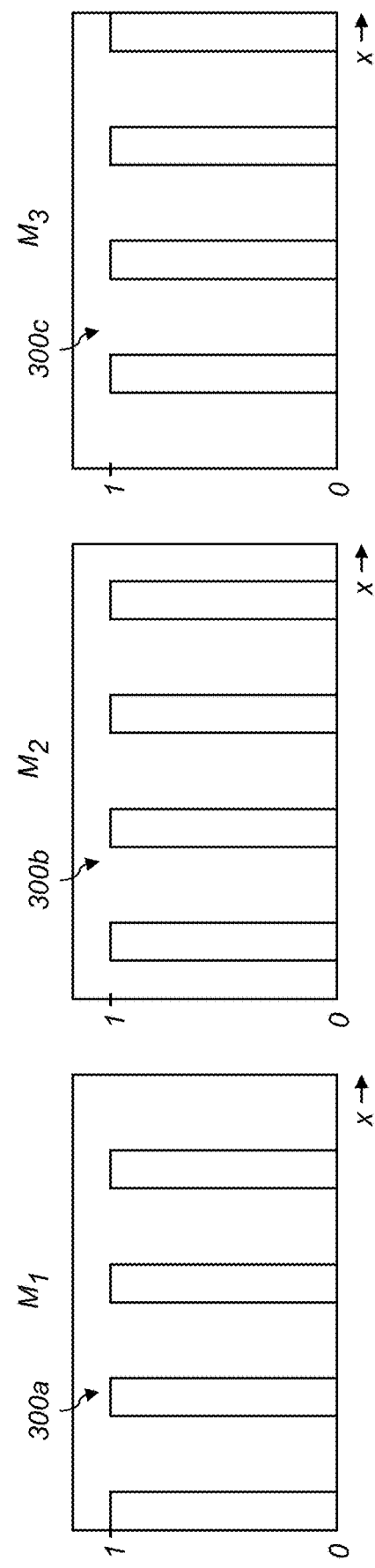
FIG. 11 illustrates an exemplary set of three complementary mask patterns.

The preceding exemplary sets of mask patterns 205 have included two complementary mask patterns 205a, 205b. In other embodiments, the set of mask patterns 205 can include more than two patterns. For example, FIG. 11 illustrates a set of three complementary mask patterns $M_1$, $M_2$, $M_3$. In this case, the mask patterns are interleaved line patterns.

It will be recognized to those skilled in the art that a large variety of different complementary mask patterns 205 can be used in various embodiments in addition to those described here. For example, in some embodiments, the mask patterns 205 can be halftone dot patterns formed using any type of halftoning algorithm known in the art. In other embodiments, the mask patterns 205 can correspond to a set of complementary basis functions (e.g., wavelet basis functions). Any such set of mask patterns can be used in accordance with the present invention provided that they satisfy the complementary definition discussed above.

A general design principal for choosing a set of mask patterns 205 that will produce desirable results is that when they are applied to successive part layers and the masked part layers are printed and overlaid, that the resulting composite part layers cross-section 140 (see FIG. 6E) should be substantially uniform. Within the context of the present invention, "substantially uniform" should be taken to be uniform to within 5%. More preferably, the composite part layers cross-section 140 should be uniform to within 1%. The set of mask patterns 205 that produces the best results in a particular application may be dependent on the characteristics of the part material 66p, the electrophotography engines 12p, 12s and layer transfusion assembly 20 in the additive manufacturing system 10 (FIG. 1). In some embodiments, a parameter of the mask patterns such as the width of the features can be varied and the feature width that produces the lowest level of non-uniformity can be selected.

Returning to a discussion of FIG. 7, the mask patterns 205 are used together with the part layer patterns 200 to print a 3D part 255 using an electrophotography-based additive manufacturing system. For each part layer pattern 210 ($P_i$) in the sequence of part layer patterns 200, a select mask pattern step 215 is used to select a corresponding mask pattern 220 ($M_j$) that is to be used to print that part layer. In a preferred embodiment, the mask patterns are selected in a repeating sequence as a function of the layer number. For example, if there are two mask patterns 205 (i.e., $N_M=2$), the first mask pattern $M_1$ can be selected for odd layer numbers and the second mask pattern $M_2$ can be selected for even layer numbers. More generally, the selected mask pattern 220 can be determined using a modulo operation (e.g., j=(i mod $N_M$)+1).

An apply mask pattern step 225 is then used to apply the selected mask pattern 220 to the part layer pattern 210 to form a masked part layer 230 ($L_i$). The process of performing the apply mask pattern step 225 involves modulating the part layer pattern 210 with the mask pattern 200. In an exemplary embodiment, the masked part layer 230 is formed by a pixel-wise multiplication of the mask pattern 220 and the part layer pattern 210:

$$L_i(x,y) = P_i(x,y) \cdot M_j(x_m, y_m)$$

where (x,y) is the voxel position within the part layer pattern 210, and ($x_m, y_m$) is the corresponding mask pixel position within the mask pattern 220. To tile the mask pattern 220 across the part layer pattern 210, the mask pixel position can be determined using modulo operations: $x_m = x \bmod S_x$, $y_m = y \bmod S_y$, $S_x$ and $S_y$ being the size of the mask pattern 220 in the x and y directions, respectively.

Figure 12:
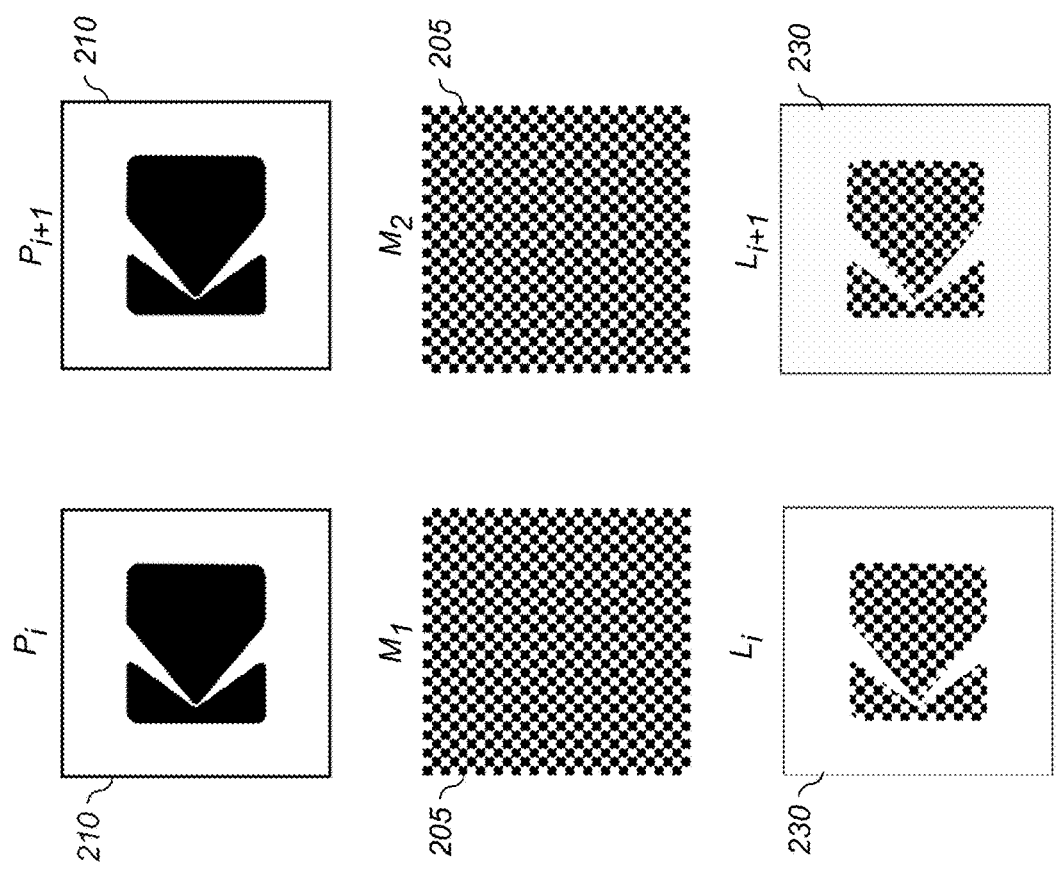
FIG. 12 illustrates the formation of masked part layers using a set of complementary mask patterns.

FIG. 12 illustrates exemplary part layer patterns 210 ($P_i$, $P_{i+1}$) and corresponding mask patterns 205 ($M_1$, $M_2$). Applying the mask patterns 205 to the part layer patterns 210 forms the masked part layers 230 ($L_i$, $L_{i+1}$). It can be seen that the voids in the masked part layer $L_i$ correspond to the filled areas in the masked part layer $L_{i+1}$.

Once the masked part layer 230 has been formed, a develop part layer step 235 is used to form a developed part layer of the 3D part 255 using the electrophotography engine 12p (FIG. 2). The electrophotography engine 12p forms the developed part layer by exposing the photoconductive surface 46 using the imager 56 in accordance with the pattern of the masked part layer 230, and then develops the part material pattern using the development station 58. As described earlier, the developed part layer (i.e., part material layer 64p in FIG. 2) is typically formed on a transfer belt 22, which is then used to transport the developed part layer to a layer transfusion assembly 20 (FIG. 4) where it is transfused together to previously printed part layers using a transfuse part layer step 240 to form a printed part layer 245 of the 3D part 255.

A done test 250 then determines whether the printing process is done, or whether additional part layers still need to be printed. If the printing process is done, the final 3D part 255 is complete. Otherwise, the layer printing process is repeated for the next part layer pattern 210 ($P_{i+1}$).

In a preferred embodiment, the sequence of part layer patterns 200 that is printed includes a set of part layers corresponding to different vertical positions within the 3D part. The part layer for each vertical position is repeated $N_M$ times within the sequence of part layer patterns 200, so that the part layer for each vertical position is printed using each of the different mask patterns 205 and superimposed during the transfuse part layer step 240. This is generally appropriate if the height of the composite part layers cross-section 140 (FIG. 6E) formed from the set of masked part layers 230 is approximately the same as the height of an individual developed part layer cross-section 135a, 135b.

Figure 13:
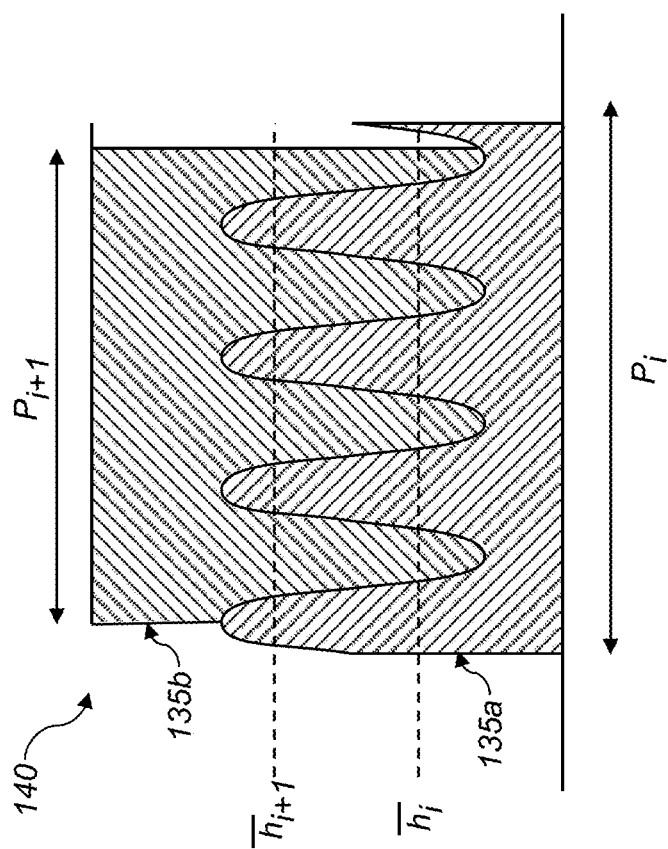
FIG. 13 illustrates the superposition of developed part layers having partially-filled voids.

In other configurations, there may be significant amounts of part material in the "void regions" of the developed part layer cross-section 135a, 135b (FIG. 6C-6D). In such cases, the height of the composite part layers cross-section 140 may be significantly higher than the height of the individual developed part layer cross-sections 135a, 135b. Therefore, the average vertical position of the second developed part layer cross-section 135b may be higher than that of the first developed part layer cross-section 135a. Therefore, it may be appropriate to determine different part layer patterns 210 corresponding to the different average vertical positions of the printed part layers 245. This can enable a finer spatial resolution of the 3D part 255 in the vertical direction. This is illustrated in FIG. 13, which shows a second developed part layer cross-section 135b superimposed on a first developed part layer cross-section 135a. The "voids" in the developed part layer cross-section 135a, 135b are partially filled by part material such that the height of the composite part layers cross-section 140 is significantly higher than the height of the individual developed part layer cross-sections 135a, 135b. Furthermore, the average vertical position of the second developed part layer cross-section 135b ($\bar{h}_{i+1}$) is at a higher vertical position than the average vertical position of the first developed part layer cross-section 135a ($\bar{h}_i$). Accordingly, the part layer patterns $P_i$, $P_{i+1}$ have different extents corresponding to the different profiles of the 3D part 255 (FIG. 7) at those vertical positions.

In some embodiments, one or more aspects of the mask patterns 205 can be varied as a function of the layer number. For example, the phase of the mask patterns 205 can be varied by shifting the horizontal and/or vertical position of the mask patterns 205 when they are applied to the part layer patterns 210. The phase shifts can be applied by modifying the equation used to calculate the mask pixel position: $x_m=(x+\Delta x) \bmod S_x$, $y_m=(y+\Delta y) \bmod S_y$, where $\Delta x$ and $\Delta y$ are the phase shifts. The variations can be random or can be according to a predefined sequence. In other embodiments, the order that the mask patterns 205 are applied can be varied.

Preferably, the aspects of the mask patterns 205 that are varied are kept constant within a cycle of the mask patterns 205. For example, if there are two mask patterns 205, the phase can be adjusted then two printed part layers 245 can be formed using the two mask patterns 205. Then the phase can be adjusted again before printing the next two printed part layers 245. In this way, the complementary relationship between the mask patterns 205 is preserved within the pairs of printed part layers 245. An advantage of varying the phase in this way is that the positions of any residual variations in the layer thickness that may remain when the printed part layers 245 are overlaid will be randomized so that they do not superimpose to produce larger variations.

The invention has been described in detail with particular reference to certain preferred embodiments thereof, but it will be understood that variations and modifications can be effected within the spirit and scope of the invention.

PARTS LIST 10 additive manufacturing system
12p electrophotography (EP) engine
12s electrophotography (EP) engine
14 belt transfer assembly
16 biasing mechanism
18 biasing mechanism
20 layer transfusion assembly
22 transfer belt
22a front surface
22b rear surface
24 belt drive mechanism
26 belt drag mechanism
28 loop limit sensor
30 idler roller
32 belt cleaner
34 rotational direction
36 controller
38 host computer
40 frame
42 photoconductor drum
42a intermediary drum
44 conductive drum body
46 photoconductive surface
48 shaft
50 drive motor
50a drive motor
52 rotation direction
52a rotation direction
54 charging device
56 imager
58 development station
60 cleaning station
62 discharge device
64 combined layer
64p part material layer
64s support material layer
66p part material
66s support material
68 build platform
70 nip roller
72 heater
74 heater
76 post-fuse heater
78 air jets
80 3D part
82 support structure
84 gantry
86 motion pattern
88 motor
90 heating element
92 rotation direction
100 heating element
100 part layer pattern
110 exposure pattern cross-section
120 developed part layer cross-section
130a masked exposure pattern cross-section
130b masked exposure pattern cross-section
135a developed part layer cross-section
135b developed part layer cross-section
140 composite part layers cross-section
200 part layer patterns
205 mask patterns
205a mask pattern
205b mask pattern
210 part layer pattern
215 select mask pattern step
220 mask pattern
225 apply mask pattern step
230 masked part layer
235 develop part layer step
240 transfuse part layer step
245 printed part layer
250 done test
255 3D part
300a mask-pattern cross-section
300b mask-pattern cross-section

The invention claimed is:

1. A method for printing a three-dimensional part with an electrophotography-based additive manufacturing system, comprising:
receiving a sequence of part layer patterns defining the three-dimensional part to be printed, each part layer pattern having an associated layer number;
receiving first and second mask patterns, wherein the second mask pattern is complementary to the first mask pattern;
for each part layer pattern in the sequence of part layer patterns:
selecting a mask pattern according to the layer number of the part layer pattern, wherein the first mask pattern is selected for odd layer numbers and the second mask pattern is selected for even layer numbers;
forming a masked part layer by applying the selected mask pattern to the part layer pattern;
developing a developed part layer of the three-dimensional part with an electrophotography engine using the masked part layer;
transfusing the developed part layer together to previously-printed part layers to form a printed part layer of the three-dimensional part;
wherein the masked part layer is formed by pixel-wise multiplication of the selected mask pattern and the part layer pattern.

2. The method of claim 1, wherein the first and second mask patterns are checkerboard patterns or repeating line patterns.

3. The method of claim 1, wherein the first and second mask patterns are binary.

4. The method of claim 1, wherein the first and second mask patterns are non-binary mask patterns.

5. The method of claim 4, wherein elements of the first and second mask patterns are asymmetric.

6. The method of claim 1, wherein filled areas in the first mask pattern overfill voids in the second mask pattern and filled areas in the second mask pattern overfill voids in the first mask pattern when the first and second mask patterns are superimposed.

7. The method of claim 1, wherein filled areas in the first mask pattern underfill voids in the second mask pattern and filled areas in the second mask pattern underfill voids in the first mask pattern when the first and second mask patterns are superimposed.

8. The method of claim 1, wherein the mask pattern is tiled across the part layer pattern.

9. The method of claim 1, wherein a part layer pattern corresponding to a particular vertical position in the three-dimensional part is repeated in the sequence of part layer patterns such that the first and second mask patterns are successively applied to a same part layer pattern.

10. The method of claim 1, wherein each of the part layer patterns in the sequence of part layer patterns correspond to different vertical positions in the three-dimensional part.

11. The method of claim 1, further including:
receiving a sequence of support layer patterns defining a support structure for the three-dimensional part to be printed, each support layer pattern having an associated layer number;
for each support layer pattern in the sequence of support layer patterns:
selecting a mask pattern according to the layer number of the support layer pattern, wherein the first mask pattern is selected for odd layer numbers and the second mask pattern is selected for even layer numbers;
forming a masked support layer by applying the selected mask pattern to the support layer pattern;
developing a developed support layer of the support structure with an electrophotography engine using the masked support layer;
transfusing the developed support layer together to previously-printed part and support layers to form a printed support layer of the support structure.

12. The method of claim 1, wherein a phase of the first and second mask patterns is varied for pairs of part layer patterns.

13. A method for printing a three-dimensional part with an electrophotography-based additive manufacturing system, comprising:
receiving a sequence of part layer patterns defining the three-dimensional part to be printed, each part layer pattern having an associated layer number;
receiving a mask pattern set including two or more mask patterns;
for each part layer pattern:
selecting a mask pattern from the mask pattern set, wherein the mask patterns are selected in a repeating sequence as a function of the layer number;
forming a masked part layer by applying the selected mask pattern to the part layer pattern;
developing a developed part layer of the three-dimensional part with an electrophotography engine using the masked part layer;
transfusing the developed part layer together to previously-printed part layers to form a part layer of the three-dimensional part;
wherein the masked part layer is formed by pixel-wise multiplication of the selected mask pattern and the part layer pattern.

14. The method of claim 13, wherein the mask patterns in the mask pattern set correspond to a set of basis functions.

* * * * *